(12) United States Patent
Rezai-Kalantary (10) Patent No.: US 8,218,292 B2
(45) Date of Patent: Jul. 10, 2012

(54) DRY POWDER STENCIL PRINTING OF SOLID ELECTROLYTIC CAPACITOR COMPONENTS

(75) Inventor: Majid Rezai-Kalantary, Devon (GB)

(73) Assignee: AVX Corporation, Myrtle Beach, SC (US)

( * ) Notice: Subject to any disclaimer, the term of this patent is extended or adjusted under 35 U.S.C. 154(b) by 383 days.

(21) Appl. No.: 12/533,407

(22) Filed: Jul. 31, 2009

(65) Prior Publication Data

US 2011/0026192 A1    Feb. 3, 2011

(51) Int. Cl.
*H01G 4/02* (2006.01)

(52) U.S. Cl. ........ 361/529; 361/516; 361/519; 361/523; 361/525; 361/528; 29/25.01; 29/25.03

(58) Field of Classification Search ................. 361/529, 361/523–525, 528, 516–519, 509–512, 530; 29/25.01, 25.03

See application file for complete search history.

(56) References Cited

U.S. PATENT DOCUMENTS

| | | | |
|---|---|---|---|
| 4,756,759 A | 7/1988 | Amon et al. | |
| 5,349,496 A * | 9/1994 | Taniguchi et al. | 361/528 |
| 5,355,794 A | 10/1994 | Freudenheim | |
| 5,357,399 A | 10/1994 | Salisbury | |
| 6,307,735 B1 * | 10/2001 | Saito et al. | 361/517 |
| 6,493,213 B1 | 12/2002 | Clasen et al. | |
| 6,510,044 B1 * | 1/2003 | Loffelholz et al. | 361/510 |
| 6,643,121 B1 | 11/2003 | Huntington | |
| 6,673,389 B1 | 1/2004 | Huntington | |
| 6,684,768 B2 | 2/2004 | Miyata et al. | |
| 6,699,767 B1 | 3/2004 | Huntington | |
| 6,751,085 B1 | 6/2004 | Huntington | |
| 6,813,140 B1 | 11/2004 | Huntington | |
| 6,849,292 B1 | 2/2005 | Huntington | |

FOREIGN PATENT DOCUMENTS

WO    WO 0028559 A1    5/2000

* cited by examiner

*Primary Examiner* — Nguyen T Ha (74) *Attorney, Agent, or Firm* — Dority & Manning, P.A.

(57) ABSTRACT

Solid electrolytic capacitors and related methods for forming such capacitors may variously involve forming at least one of a seed, grip, reference point and/or anode body by stencil printing of dry powder. In accordance with a method of forming anodic components for electrolytic capacitors, a stencil is positioned adjacent to a substrate, the stencil being formed to define a plurality of apertures therethrough. A plurality of printed powder portions are selectively printed on the substrate by placing dry powder into selected ones of the plurality of apertures defined in the stencil. The printed powder portions are then sintered to form respective anodic components for multiple respective electrolytic capacitors.

20 Claims, 6 Drawing Sheets

DRY POWDER STENCIL PRINTING OF SOLID ELECTROLYTIC CAPACITOR COMPONENTS

BACKGROUND OF THE INVENTION

Solid electrolytic capacitors (e.g., tantalum capacitors) have been a major contributor to the miniaturization of electronic circuits and have made possible the application of such circuits in extreme environments. An example of a solid state capacitor and related mass production method for manufacturing surface mountable solid state capacitors is disclosed in U.S. Pat. No. 5,357,399 (Salisbury).

Some solid electrolytic capacitors have an anode lead formed of a substantially planar surface that is bonded to an anode body with a seed/seeding layer. Seed layers, and sometimes the anode bodies as well, have been formed as respective continuous planes of material that are cut in multiple dimensions to provide discrete capacitor elements. For example, U.S. Pat. No. 6,699,767 (Huntington) discloses a method for manufacturing multiple solid state capacitors that includes steps for forming such seed and anode components. An entire upper surface of a wafer has sintered thereon a seed layer, for example a dispersion of tantalum powder. A green (i.e., un-sintered) mixture of fine-grained capacitor grade tantalum powder is then pressed onto the upper surface of the substrate to form a green layer. The green layer is sintered to fuse the fine grained powder into an integral porous network. The sintering process also fuses the porous layer to the coarse seeding layer. The substrate assembly is then machined to produce an orthogonal grid of transverse channels and longitudinal channels, which are cut to a depth just beyond the level of the porous tantalum layer so that the cuts impinge on the substrate. The machining process produces an array of orthogonal section bodies, on the substrate, which are ultimately processed to form the anode portions of the capacitors.

In a related variation to the above manufacturing process, a continuous plane of material forming a seed layer is formed over the substrate and sintered. Subsequently, anodes of the same or varying heights are matrix pressed onto the seeded wager. After pressing, the anodes are sintered. Series of orthogonal cuts must also still be performed through the seed layer slightly into the wafer to remove the seed from between respective anode layer bodies and form discrete capacitor elements.

The multiple steps for forming discrete capacitor elements, especially the cutting steps in U.S. Pat. No. 6,669,767 (Huntington) to produce the transverse and longitudinal channels, can be a time-consuming and expensive part of the manufacturing process. In addition, generally thicker substrates are required so that the channels can be cut into the substrate beyond the level of the porous tantalum layer thereon, thus limiting potential volumetric efficiency of the capacitor elements. Such conditions leave room for improvement in the manufacturing process.

SUMMARY OF THE INVENTION

In accordance with one exemplary embodiment of the present invention, a method of forming anodic components for electrolytic capacitors includes positioning a stencil adjacent to a substrate, the stencil being formed to define a plurality of apertures therethrough, selectively printing a plurality of printed powder portions on the substrate by placing dry valve metal powder into selected ones of the plurality of apertures defined in the stencil, and sintering the printed powder portions to form respective anodic components for multiple respective electrolytic capacitors.

In accordance with another exemplary embodiment of the present invention, a method of forming seed layers for electrolytic capacitors includes positioning a stencil adjacent to an electrically conductive substrate, the stencil being formed to define a plurality of apertures therethrough, selectively printing a plurality of printed powder portions on the substrate by placing dry powder into selected ones of the plurality of apertures defined in the stencil, sintering the printed powder portions to form a plurality of respective seeds for multiple respective electrolytic capacitors, placing an anode body on top of each printed powder portion, sintering the anode bodies, forming a dielectric layer over the anode bodies, forming a cathode layer over the dielectric layer to yield resultant capacitor bodies, encapsulating the side walls of the capacitor bodies with an electrically insulating material, and dividing the processed substrate into a plurality of individual capacitor bodies each having a sheath of encapsulating material, an anode terminal surface portion at one end and a cathode terminal surface portion at the other end.

In a still further exemplary embodiment of the present invention, a solid electrolytic capacitor includes a capacitor element, an anode lead, an anode termination and a cathode termination. The capacitor element includes an anode body, a dielectric layer overlying at least a portion of the anode body, and a cathode overlying at least a portion of the dielectric layer, the cathode including a solid electrolyte. The anode lead is electrically connected to a surface of the anode body by a printed dry powder seed layer, wherein the printed dry powder seed layer is sinter bonded to both the anode lead and the anode body. The anode termination is electrically connected to the anode lead, and the cathode termination is electrically connected to the cathode.

Other features and aspects of the present invention are set forth in greater detail below.

BRIEF DESCRIPTION OF THE DRAWINGS

A full and enabling disclosure of the present invention to one skilled in the art, including the best mode thereof, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to solid electrolytic capacitors and methods for making such capacitors in which at least one feature of the capacitor, such as an anodic component, is formed by a printed layer of dry powder. In one embodiment, discrete respective seed layer portions are printed on a substrate (e.g., a wafer) for facilitating bonding of respective anode bodies to the substrate. In another embodiment, anode bodies are printed either on top of the seed layer portions or directly to a substrate (e.g., wafer, foil or tape). In a still further embodiment, seed layer portions with outlying grips for facilitating bonding of a base channel insulation material are printed to a substrate. Stencil printing techniques may be used for applying the dry powder. Additional steps may then be taken to form the remaining components of a solid electrolytic capacitor.

The subject technology employs selective printing of dry powders. As used herein, the term "dry powder" means a powder having either no solvent or binder, or a limited amount of solvent or binder, involved in the material that is printed, as compared with conventional pastes. In one embodiment, a dry powder corresponds to a powder having no substantial amount or only a negligible amount of any solvent therein. In another embodiment, a dry powder corresponds to a powder having a level of solvent or binder less than about 5.0% by weight of the total mass, less than about 2.0% by weight of the total mass of the composition, less than about 1.0%, less than about 0.5% or less than 0.1%. The elimination or reduction of solvents/binders relative to conventional pastes advantageously reduces cost and process steps, particularly for removal of such components by heating or other step during the manufacturing process. The use of dry powder also means that the purity of the powder will remain the same after sintering relative to conventional seeding techniques.

The types of dry powders used in accordance with the subject technology for selectively forming seed layer portions, grip portions, and/or anode bodies may include particles that are formed from a composition that includes a refractory metal, such as tungsten, molybdenum, niobium, tantalum, rhenium, osmium, iridium, ruthenium, hafnium, zirconium, vanadium, chromium, as well as electrically conductive alloys, oxides, and nitrides of these metals. Depending on the application, the specific charge of the dry powders used may vary from within a range of about 1,000 $\mu F*V/g$ to about 500,000 $\mu F*/g$. Depending on the application the particle size of the dry powders used may vary from about 0.01 microns to about 200 microns. In one example, the particle size is less than or equal to the height of the stencil thickness used in the printing process.

Ultimately, the particle size of the powder may also depend on the size of the apertures used for stencil printing of the seed, grip and/or anode body portions. In particular, different particle sizes may be chosen based on the desired capacitor component footprint. For example, when smaller capacitors are made for smaller case sizes, the openings in the stencil may be smaller. As such, a smaller particle size may be used (e.g., as achieved by sieving a given dry powder to an appropriate particle size) to help accommodate the smaller stencil aperture. This may generally ease printing and enable more contact points with the pressed anodes that are subsequently applied to the seeds.

In one exemplary embodiment, selected capacitor components (e.g., anodes, seeds and/or grips) are formed from exemplary dry powders including ones that may be characterized by a specific charge of between about 1,000 $\mu F*V/g$ and 10,000 $\mu F*V/g$ in one example, or between about 2,000 $\mu F*V/g$ and 4,000 $\mu F*V/g$ in another example. The dry powder may be characterized by an average particle size of from about 1 to about 100 micrometers (microns) in one example, from about 10 to about 70 microns in one example, or from about 20 to about 50 microns in another example. Specific examples of a tantalum powder for use in some embodiments corresponds to a capacitor grade tantalum powder such as but not limited to S700 or S506 formulations offered by Showa-Cabot or STA100, STA150, STA200 or QR7 formulations offered by H. C. Starck. In one example, the particles may have a $D_{90}$ particle size distribution (90 wt. % of the particles have a diameter below the reported value) of about 150 micrometers or less, of between about 0 and about 37 microns.

In one example, the same powder as described above is used for printing a seed layer for bonding to an anode, and optional grip outline for bonding to a channel insulator (e.g., polymer). Anodes may also be formed over the seed layer portions using the same powder described above or a different powder as described below. When the same powder is used for the seeds and anodes, the seeds may be formed and sintered at a higher temperature (e.g., in a range of between about 1400-1900° C.) and the anodes are sintered at a lower temperature (e.g., between a range of between about 1300-1700° C.). In another example, anodes are formed using the powders described above without the use of a seed layer. When pressed anodes are used in conjunction with printed powder seed portions, even lower ranges of sintering temperatures may be used for sintering the pressed anodes.

In another example, the specific powders described above are used for the seeds and optional grips, but a different powder is used to form the anode bodies. Alternatively, both the anodes and seeds/grips can be formed from the different specific powders now described. In one such instance, a relatively higher specific charge dry powder may be formed from a valve metal composition having a high specific charge, such as about 40,000 µF*V/g or more, in some embodiments about 50,000 µF*V/g or more, in some embodiments about 70,000 µF*V/g or more, in some embodiments from about 100,000 µF*V/g to about 150,000 µF*V/g and in some embodiments, from about 70,000 to about 500,000 µF*V/g. The dry powder of the present invention used for anode bodies may have an average particle size in a range from about 1 to about 100 micrometers, ultimately depending on the aperture size of the stencil. In one exemplary embodiment, the particle size of the powder should be less than the thickness of the stencil so that no particles are pulled or broken by the squeegee during the stencil printing process. The valve metal composition for the anode bodies may contain a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The substrate to which the subject dry powders may be printed may be constructed using any of a variety of techniques. The geometric configuration of the substrate may generally vary as is well known to those skilled in the art, such as in the form of a wafer, foil, tape, sheet, screen, mesh, etc. The substrates may generally be electrically conductive and made of a chosen material that is compatible with the type of dry powder being printed thereon. In one embodiment, the substrate contains a metal substrate that may include any metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), oxides or nitrides thereof and so forth. Tantalum metals, as well as alloys thereof, are particularly suitable for use in the present invention. In one particular example, an electrically conductive wafer is made of tantalum, niobium, oxides of tantalum or niobium, or the like. In other examples, a substrate is formed by coating a low cost material (e.g., stainless steel, copper or the like) with an outer layer of suitable conductive material such as a tantalum or others as described above.

Shapes and sizes of the substrate may also vary. For example, the peripheral shape of the substrate can be square, rounded or any other shape as desired. In one example, an electrically conductive wafer has a thickness of between about 25 microns and about 400 microns, or between about 50 microns and about 100 microns. Particular examples include substrate thicknesses of about 50 microns, 100 microns, 150 microns, 250 microns and 400 microns. It should be appreciated that even thicker substrates could be used and then back-grinded to achieve a smaller desired thickness. The surface area of the substrate may vary depending on the number of components being printed thereon. Exemplary dimensions of the surface areas onto which an array of printed powder portions may be printed may correspond to between about 43 mm by 43 mm, although it should be appreciated that wafer area can vary as desired for printing on smaller or larger substrates depending on the manufacturing requirements. Printing can be done selectively to cover the whole or part of the wafer or substrate.

After seeds are printed on a substrate in accordance with one aspect of the present invention, the respective seeds may be used to adhere pressed or printed anode bodies to the substrate. Alternatively, anode bodies may be directly printed on a substrate in accordance with the disclosed techniques. The resultant anodic components may then be processed using conventional techniques. In particular, once attached to a substrate, seed or lead the anode body may be anodized so that a dielectric layer is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping the anode into the electrolyte. The electrolyte is generally in the form of a liquid, such as a solution (e.g., acid or alkaline), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive having any suitable range of ionic conductivities. Exemplary electrolytes may include metal salts, alkali salts, alkali salt mixed with glycol, an acid mixed with organic solvent or phosphoric acid mixed with glycol. To enhance the ionic conductivity of the electrolyte, a compound may be employed that is capable of dissociating in the solvent to form ions. Suitable ionic compounds for this purpose may include, for instance, acids, such as nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores, with the thickness of the dielectric generally governed by temperature, with lower temperatures generally resulting in thinner oxides.

The anodized part may be subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, a conductive polymer coating may be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H. C. Starck. CLEVIOS C is a commercially available catalyst for CLEVIOS M, which is 3,4-ethylene dioxythiophene, a PEDT monomer also sold by H. C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. Techniques, such as described above, may be described in more detail in U.S. Publication No. 2008/0232037 to Biler.

In addition, the catalyst (e.g., CLEVIOS C) may also be mixed with the material(s) used to form the optional protective coating (e.g., resinous materials). In such instances, the anode part may then be dipped into a solution containing the monomer (CLEVIOS M). As a result, the monomer can contact the catalyst within and/or on the surface of the protective coating and react therewith to form the conductive polymer coating. Techniques, such as described above, may be described in more detail in U.S. Pat. No. 7,460,358 to Biler. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

Once applied, the solid electrolyte may be healed. Healing may occur after each application of a solid electrolyte layer or may occur after the application of the entire coating. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the part may optionally be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

An electrolytic capacitor of the present invention may also contain an anode termination to which the anode lead (i.e., electrically conductive substrate) of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, tungsten and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters.

The terminations may be connected using any technique known in the art, such as adhesive bonding and the like. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Figure 1:
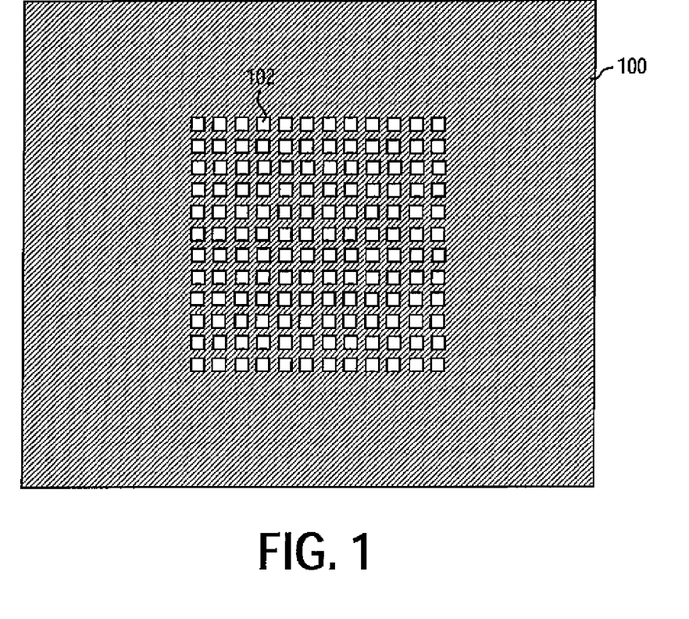
FIG. 1 is a plan view of one embodiment of a stencil for printing dry powder in accordance with an aspect of the present invention.
Figure 2:
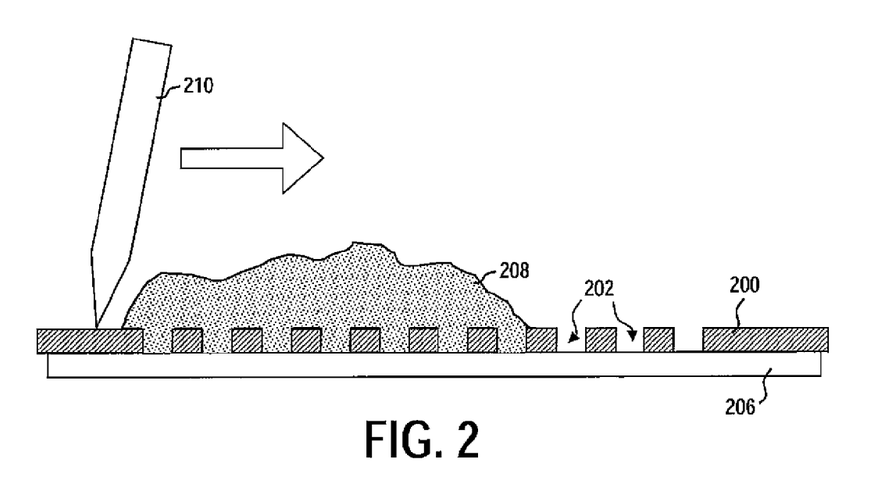
FIG. 2 is a cross-sectional view of one embodiment of a substrate and stencil for printing dry powder in accordance with an aspect of the present invention.
Figure 3:
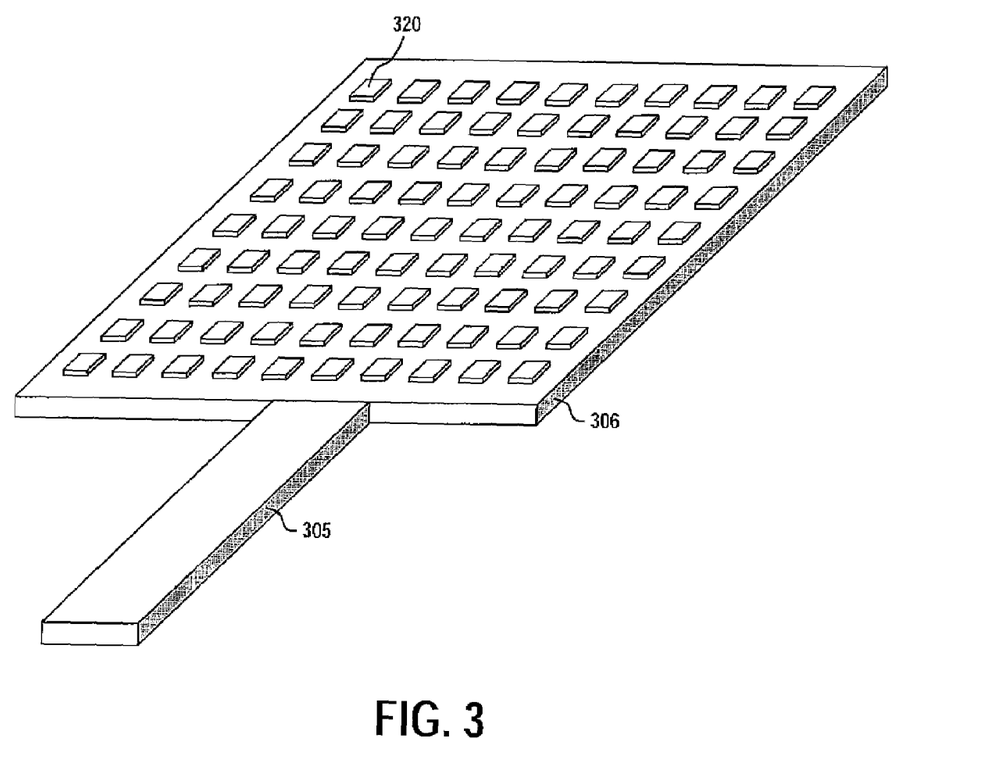
FIG. 3 is a perspective view of a substrate with multiple portions of dry printed powder, such as may be used to form seeds or low profile anodes in accordance with an aspect of the present invention.

Referring now to the drawings, FIGS. 1-3 illustrate general aspects of how stencil printing of dry powder can be used to form one or more capacitor elements. In particular, a stencil 100 or other framework may be provided for selectively printing dry powder in specific discrete locations. Stencil 100 is formed to define a plurality of apertures (i.e., openings) 102 in which dry powder may be placed. In one example, the plurality of apertures 102 are configured in an array, for example a rectangular array of x by y openings. In some embodiments, the x and y values defining an array of apertures are integer values respectively chosen from within a range of about five to fifty (5-50). Each aperture 102 may be variously selected as a square-shaped, rectangular, circular or other shaped opening. The size of each aperture 102 may vary, ranging from about 50 microns to about 1000 microns across, for example 400×400 microns in one particular example, 660×660 microns in another example, and 1000×1000 microns in a still further example. It should be appreciated that other arrangements or designs of the aperture size, shape and location across a stencil may vary.

FIG. 2 shows a generally side cross-sectional view of a similar stencil 200 having apertures 202 (although not as numerous as the apertures 102 in the stencil 100 of FIG. 1). Stencil 200 may be made of any of a variety of materials, including conductive materials such as metals (e.g., nickel) or the like. Stencil 200 is controllably positioned adjacent to a substrate 206 such that the stencil and substrate are just touching. As previously described, substrate 206 may variously correspond to a wafer (e.g., an electrically conductive wafer such as one made of tantalum, niobium, oxides of tantalum or niobium, or the like). A dry powder 208, such as described above, may be provided over the surface of the stencil apertures such that the powder 208 substantially fills each aperture between the surface of substrate 206 and the top of the stencil 200. In one example about 25 grams of powder is placed onto the stencil. The powder may be compacted into each aperture 202 by forcible movement of a squeegee 210 or other device along the top surface of the stencil 200. The stencil may then be removed from the substrate manually, semi-manually or automatically by lifting the stencil or withdrawing the printed wafer from the base of the stencil.

To aid deposition of the powder to the substrate, a controlled vibration or knock can be applied to the stencil. Such vibration can facilitate release of the powder from the respective apertures. After removing the stencil 200, the remaining respective powder portions can then be sintered to yield a plurality of respective sintered printed powder portions 320 on a substrate 306 as shown in FIG. 3. The substrate 306, as shown in FIG. 3, may further include an extension 305 for handling the substrate and transporting/positioning the substrate as needed relative to a stencil and/or other manufacturing components or assemblies.

Sintering of the selectively printed dry powder portions in accordance with the present invention may occur before and/or after the application and sintering of an anode body. In one particular embodiment, seeds are sintered separately from the anodes. The temperature at which the powder is sintered may range, for example, from about 1000° C. to about 2500° C., in some embodiments from about 1000° C. to about 2000° C., and in some embodiments from about 1200° C. to about 1800° C. or 1300° C. to about 1700° C. In one example, sintering of the printed seeds and optional grips may occur at a generally higher range, for example from about 1700° C. to about 1900° C., than sintering of the printed anodes which may occur, for example, from about 1200° C. to about 1500° C. When pressed anodes are applied and sintered, the pressed anodes can be sintered at a variety of appropriate suitable temperatures depending on the powder used to form such anodes. For example, a powder having a specific charge of about 200,000 μF*V/g may be sintered between 950-1200° C., an anode pressed from a powder having a specific charge of about 150,000 μF*V/g may be sintered between 1000-1300° C. and an anode pressed from a powder having a specific charge of about 50,000 μF*V/g may be sintered between 1200-1600° C. Sintering may occur at any desired pressure. The total time of sintering may also range from about 10 minutes to about 1 hour. It should be appreciated that these ranges of charges and temperatures are provided as examples only, and other higher or lower appropriate temperatures may be used.

The specific size of printed powder portions 320 may be varied depending on the element being formed. In one example, seed layers may not be as thick as anode bodies. In addition, different size elements may be needed for different end capacitor sizes. For example, one exemplary range of heights for the stencil 100, 200 and resultant printed powder portions 320 corresponds to a range of about 50-500 microns. Another exemplary range of stencil height corresponds to about 100-200 microns, or alternatively about 50-150 microns. Exemplary anode height can vary from between about 20 microns and about 1000 microns, depending on the type and surface area and the required capacitor working voltage. In one particular example, anode bodies have a profile height of between about 200 and 1,000 microns. In another example, a profile height may fall within a range of between about 400 and 700 microns. As later described with reference to FIG. 10, such anode profile heights may be achieved with a single printing step or with multiple stencil iterations to stack multiple printed powder portion layers into larger integral portions.

The footprint of the printed powder portions 320 may also vary. In one example, the footprint of each printed powder seed may generally correspond to the same footprint of a corresponding anode body mounted to the seed. In another example, the footprint of each printed powder seed portion may be up to about 25 microns greater in each dimension than the footprint of a corresponding anode body to afford less time in process preparation and operation, lower production cost and in some instances provide greater tolerance in alignment of the anode bodies to the seeds.

A first exemplary embodiment of a method of using the subject dry powder printing techniques, as well as a first exemplary capacitor embodiment formed form such a method is illustrated in and discussed with reference to FIGS. 4-7. This method particularly discloses features and steps that may be used to construct a plurality of capacitors, although it should be appreciated that similar techniques may be used to construct any particular number of components, including one or more such components.

Figure 4:
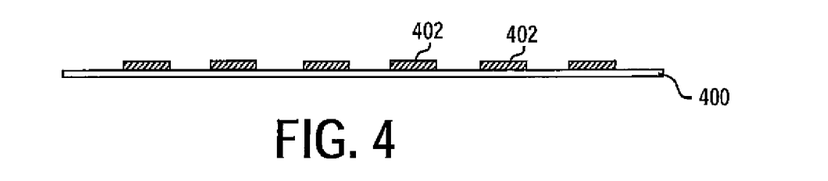
FIG. 4 is a cross-sectional view of a substrate with printed seeds in accordance with a first exemplary embodiment of the present invention.

Referring now to FIG. 4, a substrate layer 400 is provided. In general, such substrate may be relatively thinner than a substrate used in conventional capacitors where individual capacitor bodies are formed by cutting through component layers into the substrate layer. In one example, substrate 400 has a thickness of between about 50 microns and about 400 microns. Substrate 400 is a generally flat, substantially planar surface and may be formed of any suitable electrically conductive material, including but not limited to a metal wafer such as solid wafer of valve metal such as tantalum, niobium oxides thereof or the like, or stainless steel or copper that is coated with tantalum. As further shown, a plurality of seeds 402 are selectively formed along a surface of wafer 400 using the dry powder stencil printing techniques shown in FIGS. 1-3. In one example, the seeds correspond to printed powder portions that are formed from a dry tantalum powder that is applied with a stencil printing technique to a height of about 50 microns. Respective seeds 402 are formed with a substantially uniform distribution across the substrate 400.

Figure 5:
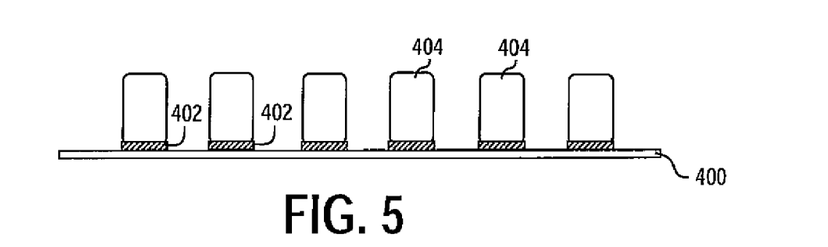
FIG. 5 is a cross-sectional view of a substrate, printed seeds and corresponding anode bodies in accordance with a first exemplary embodiment of the present invention.

The printed powder seed portions 402 are generally provided to help strengthen the bond between subsequently applied anode bodies and the substrate 400. As shown in FIG. 5, anode bodies 404 are precisely aligned to mate with respective seeds 402. Alignment of the anode bodies 404 to the respective seeds 402 may be facilitated by any number of known techniques. When a substrate is mounted into a jig machine, the dimension from a corner or other reference point on the substrate to the location of one or more printed seeds may be monitored to ensure that alignment upon printing the seeds 402 generally matches alignment upon pressing the anodes 404. Printing and/or pressing machines may include self-calibration features, self-alignment features, and/or sensor-based controls to further facilitate the alignment of seeds 402 to anode bodies 404. As previously mentioned, the footprint of seeds 402 may be slightly larger than the footprint of anode bodies 404 in one or more dimensions to accommodate more versatility in alignment of the anode bodies to the seeds.

In one example, anode bodies 404 may correspond to previously pressed pellets that are respectively positioned adjacent to the substrate 400 and seeds 402. In another embodiment, anode bodies 404 are formed from the same dry powder stencil printing techniques used to form seeds 402. For example, a stencil with similarly shaped apertures to those used to form seeds 402 may be used in one or more consecutive iterations to build up respective anode bodies 404 on top of the seeds 402. In other embodiments, thicker stencils with similar aperture locations may be used to form the anode bodies 404. In still further embodiments, the seeds 402 are printed with dry powder, but the anode bodies 404 are printed with a paste including a binder and solvent that is removed before sintering. A sintering step as previously described may be employed after the seeds 402 are provided on substrate 400 and after the anode bodies 404 are provided on top of the seeds 402. When sintering occurs after provision of the anode bodies 404, the anode bodies 404 are fused to the seeds 402 which are fused to the substrate 400.

After the precision alignment of seeds 402 and anode bodies 404 onto substrate 400, a variety of different techniques can be used to complete the formation of respective capacitor embodiments. For example, the anode bodies 404 may be anodized and applied with a solid electrolyte as described above. If desired, additional layers may be employed, such as a carbon layer 408 and/or one or more silver layers 410 which can be applied to a lid 412 when it is applied along the top of the assembly. In other embodiments, the volumetric efficiency of the capacitors can be increased by removing the need for a substrate lid as the cathode terminal, as described in PCT application CB99/03566 (to AVX Ltd), which is incorporated by reference herein for all purposes.

Figure 6:
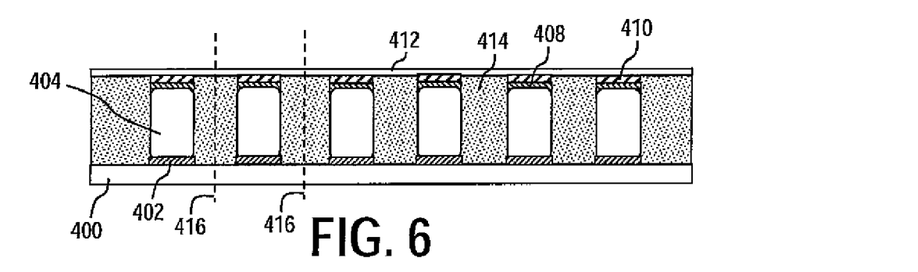
FIG. 6 is a cross-sectional view of a finished array of first exemplary solid electrolytic capacitor embodiments of the present invention.

Referring still to FIGS. 4-7, an encapsulating resin 414 may be formed to surround the respective capacitor bodies, for example by filling the channels among an array as formed in FIG. 6 with a liquid epoxy resin that encapsulates the side walls. After the resin 414 is set during the encapsulation process, the processed substrate may be sliced along the center line (showed as dashed lines 416 in FIG. 6) to separate each of the plurality of capacitor bodies into discrete units. After encapsulation, the parts are cleaned, diced and terminated. Terminations may include combinations of printed paste and/or plated layers. Additional variations that may eliminate the encapsulation may involve hermetically sealing a discrete capacitor in a package with or without additional electronic components.

Figure 7:
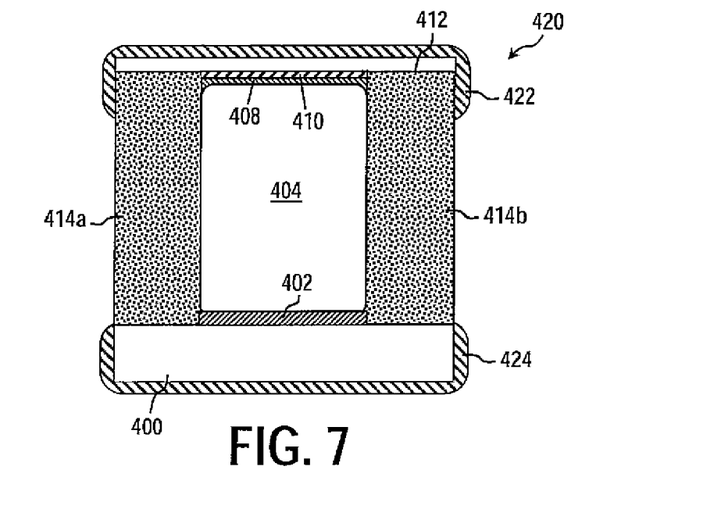
FIG. 7 is a cross-sectional view of a first exemplary solid electrolytic capacitor embodiment of the present invention.

An example of a resulting capacitor unit is shown in FIG. 7. Each capacitor 420 consists of an anode terminal portion consisting of the substrate portion 400. Upstanding from the substrate is the seed 402 and anode body 404 which is sheathed in epoxy resin sidewalls 414a and 414b. The top end region of capacitor 420 is coated in a layer of carbon paste 408, a layer of silver paste 410 and a further layer of silver paste 412 which forms a cathode terminal portion of the component. End caps 422 and 424 are provided as cathode and anode terminations, respectively, of the capacitor 420.

Additional details regarding exemplary features and/or steps that may be used to form solid electrolytic capacitors as described with reference to FIGS. 4-7 are disclosed in the following U.S. Patents, all of which are incorporated herein in their entirety by reference thereto for all purposes: U.S. Pat. No. 5,357,399 to Salisbury; U.S. Pat. No. 6,751,085 to Huntington; U.S. Pat. No. 6,643,121 to Huntington; U.S. Pat. No. 6,849,292 to Huntington; U.S. Pat. No. 6,673,389 to Huntington; U.S. Pat. No. 6,813,140 to Huntington; and U.S. Pat. No. 6,699,767 to Huntington.

Additional aspects of exemplary embodiments of the subject technology are presented in FIGS. 8-10, and generally concern the printing of seeds and/or anodes directly to a substrate 800 or 900, which may correspond in this example to a wafer, tape (e.g., reel-to-reel tape), foil or other relatively thin, substantially smooth and generally flat surface onto which anode bodies may be formed and subsequently handled for processing.

Figure 8:
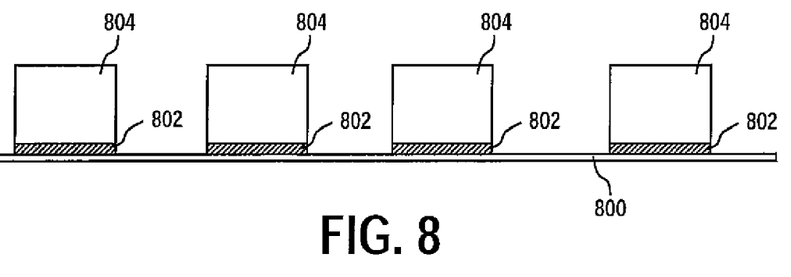
FIG. 8 is a cross-sectional view of a substrate with printed seeds and printed anodes in accordance with an exemplary embodiment of the present invention.

FIG. 8 shows an embodiment similar to that described above in which a substrate 800 is formed with two sets of printed powder portions. In particular, the subject dry powder stencil printing techniques are used to apply one or more printed powder portions 802 to substrate 800 to directly form respective seed layer portions. Anode bodies 804 are then printed directly on top of the thin seed layers. In one particular embodiment of FIG. 8, dry powder having a relatively lower specific charge (on the order of between about 1,000 and 10,000 µF*V/g and corresponding to about 3,000 µF*V/g in one embodiment) is used to form seeds 802. Then dry powder having a relatively higher specific charge (on the order of between about 100,000 µF*V/g to about 150,000 µF*V/g) are used to form anodes 804. The use of a powder having a relatively lower specific charge may sometimes be sintered at relatively higher temperatures (on the range from about 1700-1900° C.), whereas a powder having a relatively higher specific charge may be sintered at relatively lower temperatures (on the range from about 1300-1700° C.). A high temperature, low specific charge powder when used in seed layers can be advantageous because there is not a lot of shrinkage upon sintering and a good bond to the substrate is achieved. Once the powder to substrate bond is achieved, it is easier to then securely apply an anode where higher charge lower temperature powder is used for the anode.

As an alternative embodiment, it should be appreciated that seeds 802 in FIG. 8 may be formed with a higher specific charge (low sinter temperature) powder to reduce sinter temperature. When higher specific charge powder is used for the seed, it may be sintered at a slightly higher than normal temperature (e.g., 1500-1900° C. instead of normal 1300-1700° C.). The same higher specific charge powder can then be used in the anodes 804 and sintered at the normal relatively lower sintering temperatures in a range from between about 1300-1700° C.).

Figure 9:
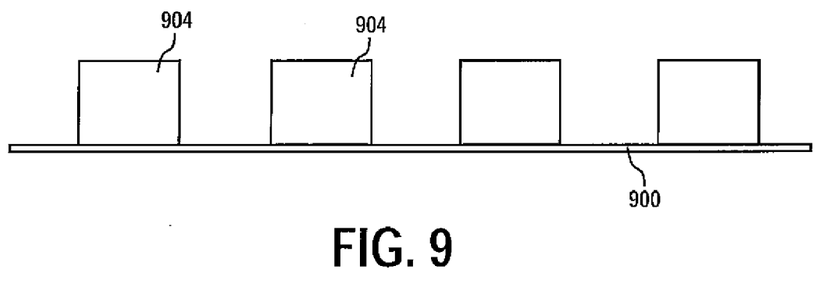
FIG. 9 is a cross-sectional view of a substrate with printed anodes in accordance with an exemplary embodiment of the present invention.

As shown in FIG. 9, it may also be possible to directly print anode bodies 904 to the substrate 900. In such instance, the dry powder used to form anodes 904 may correspond to a powder that can be sintered at a higher temperature to achieve a suitable bond to the substrate. In one example, the powder used to form the anode bodies 904 corresponds to a powder having a relatively lower specific charge (on the order of about 1,000 and 50,000 μF*V/g) and that can be sintered at a temperature within a range of between about 1400-1900° C.

Figure 10A:
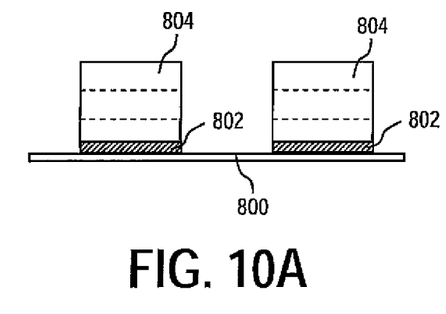
FIGS. 10A and 10B are cross-sectional views of respective substrates with printed anodes formed from multiple printing layers in accordance with an aspect of the present invention.
Figure 10B:
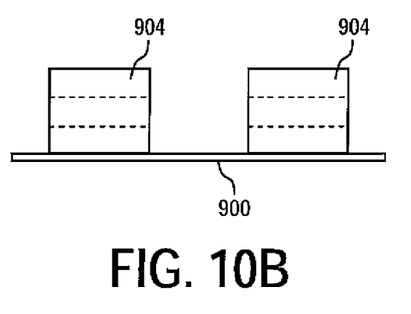

As shown in FIGS. 10A and 10B, a still further variation to the disclosed examples concerns the formation of printed anodes using multiple iterations of a printing process. For example, anodes 804 (similar to those shown in FIG. 8) and/or anodes 904 (similar to those shown in FIG. 9) may be formed from successive dry powder printing iterations (such as but not limited to three iterations as indicated by the dashed lines in each anode body 804, 904). One or more iterations may be used depending on the given stencil and aperture thickness as well as the desired profile height of the resultant anode bodies. Sintering may be used between each iteration or at the end of the build-up process.

The thickness of the printed anode bodies 804, 904 may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, T-shaped, H-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes. The anode bodies 804, 904 may be anodized and coated with an electrolyte as described in more detail above. Additional treatment steps such as but not limited to anodization, manganization, healing and the like may be implemented.

Aspects of a third exemplary embodiment of the present invention are shown in FIGS. 11-15. In general, such third exemplary embodiment is similar to the first exemplary embodiment shown in FIGS. 4-7 but with grips printed on a substrate in addition to seeds. Grips generally correspond to printed powder portions, such as formed in an outline around the seeds, to which an insulating material may be "gripped" or adhered to the substrate in the channels between adjacent seeds and corresponding anode bodies and/or around the periphery of such discrete components. To the extent that elements shown in FIGS. 11-15 are similar to those shown in FIGS. 4-7, like reference numerals are used.

Figure 11:
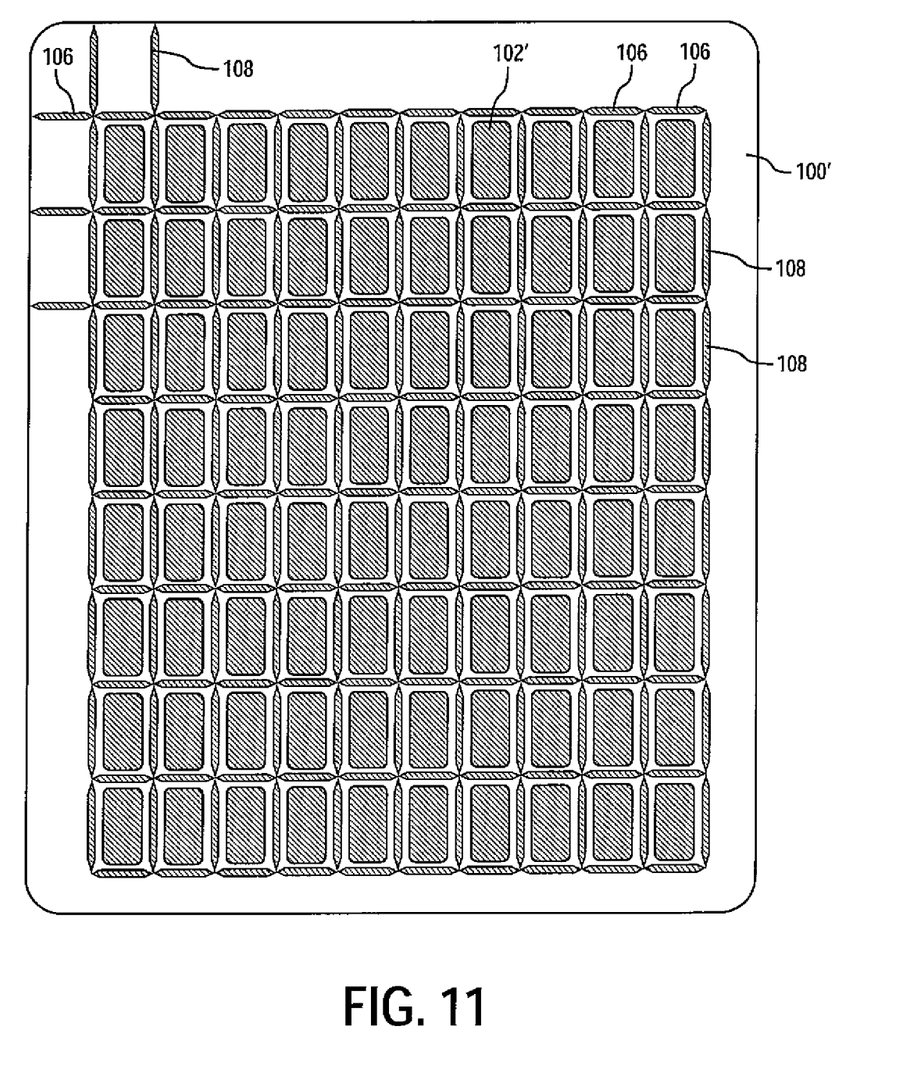
FIG. 11 is a plan view of another exemplary embodiment of a stencil for printing dry powder in accordance with an aspect of the present invention.
Figure 12:
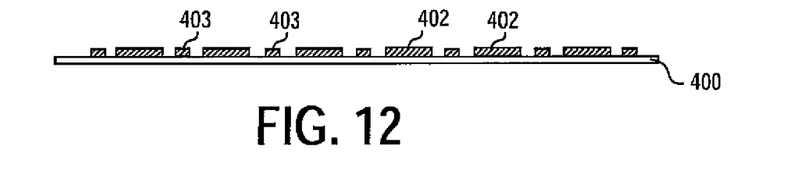
FIG. 12 is a cross-sectional view of a substrate with printed seeds and grips in accordance with a third exemplary embodiment of the present invention.
Figure 13:
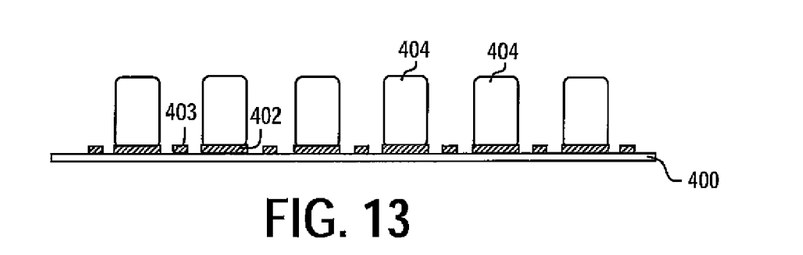
FIG. 13 is a cross-sectional view of a substrate, printed seeds and grips, and corresponding anode bodies in accordance with a third exemplary embodiment of the present invention.
Figure 14:
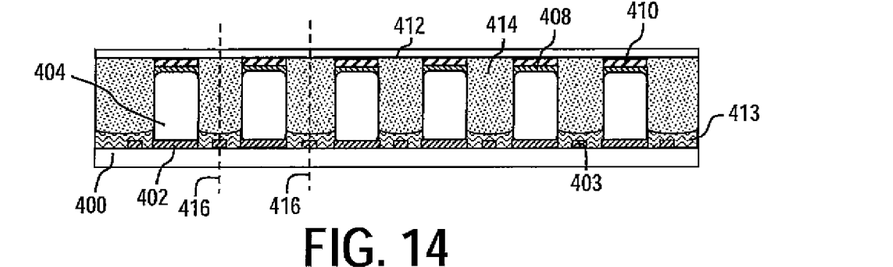
FIG. 14 is a cross-sectional view of a finished array of third exemplary solid electrolytic capacitor embodiments of the present invention.

FIG. 11 shows an exemplary stencil 100' including a plurality of seed apertures 102' corresponding to openings for forming printed powder portions corresponding to anodic seeds. In addition, stencil 100' includes a plurality of transverse apertures 106 and a plurality of longitudinal apertures 108 that combine to form an outline around each seed aperture 102'. The collection of transverse apertures 106 and longitudinal apertures 108 may be used to print grips around respectively printed seeds using additional dry powder in accordance with aspects of the present invention. In one example, the same powder used for printing the seeds is used for printing the grips. It should be appreciated that seeds and outlying grips may alternatively be printed with separate stencils (one stencil including apertures 102' and another stencil including apertures 106 and 108).

Referring still to FIG. 11, some embodiments of the present invention include stencils and corresponding printed powder portions corresponding to edge reference lines. Edge reference lines as shown in FIG. 11 correspond to additional transverse apertures 106 and/or longitudinal apertures 108, similar to the internal grip lines that can be printed all the way to one or more edges of a wafer or wafer handle to be used as alignment references for the component cutting locations. Such edge reference lines can be printed with or without internal grips.

Referring now to the cross-sectional views of FIGS. 12-15, respectively, printed grip portions 403 are deposited (i.e., printed) on substrate 400 between respective seeds 402. The provision of grips 403 serves as a bonding surface to which a base insulating material 413 may be adhered within the channels among the anode bodies 404. The provision of the insulating material 413 may occur before the processing steps of applying an electrolyte and of manganizing the anode bodies 404 to help electrically isolate the anode bodies from one another. In one embodiment, insulating material 413 may correspond to a polymer, for example a fluoropolymer, such as but not limited to polytetrafluoroethylene (PTFE), Perfluoroalkoxy (PFA), MFA, FEP or other polymers, including polymers sold by DuPont under the brandname Teflon-PFA, sold by Daikin using the brandname Neoflon-PFA or from Solvay Solexis using the brandname Hyflon-PFA.

The above techniques and resultant devices that are made from printing of dry powder may variously provide numerous advantages. In some embodiments, the subject technology provides potential improvement of component yield when multiple capacitor components are manufactured in an array-type format. The changes in manufacturing will result in reduced manufacturing time and cost. The ability to selectively print where desired (e.g., based on stencil design and application) offers a very flexible process. Still further, the subject printing techniques may also result in the formation of anode bodies generally characterized by relatively low profiles.

The subject techniques offer advantages when compared to conventional methods of forming capacitors that require multiple cuts within base seed and anode body layers. The elimination of such cuts will decrease overall processing time and cost for manufacture. Elimination of cuts may further enable the use of thinner substrates in some embodiments, thus saving additional product cost. This is because there is no need for a substrate that accommodates one or more impinging cuts into the substrate. By reducing the number of steps in a process operation, the potential for operator error should also decrease thus increasing product yield.

The subject dry powder printing techniques also offer advantages with respect to the use of less materials, thus decreasing cost and increasing volumetric efficiency. In particular, other materials used in constructing an electrolytic capacitor may be reduced in amount, thus producing significant cost savings in the manufacturing of such components. For example, a relatively thinner substrate is used. The use of small powder particle size with a thin stencil also allows thinner seeds compared to conventional methods. Less seed powder is also used, for example on the order of about 0.10-0.15 grams of powder less than heavier typical weight of about 0.3-1.0 grams of powder used in conventional methods. Less material being used in other components means more room for the capacitor anode, thus increasing overall volumetric efficiency of the subject capacitors.

The applied seed powder is also formed with a more substantially uniform thickness distribution across the substrate compared to conventional methods. Using stencil printing has also facilitated the choice for powder either by reducing powder specific charge (CV) values to make the same part or by achieving specific or better electrical properties relative to a part made with higher CV powder. Additionally or alternatively, higher CV powder can be used with a thinner substrate to facilitate formation of anodes having the same height but increased performance, thus providing capabilities for new product performance ranges.

The subject technology also offers advantages because it can be employed with a substantially flat (i.e., planar) substrate. Contrary to component substrates that employ waffle patterns or pressed-in-grip features, flat substrates may generally be less expensive and less susceptible to additional concerns. In particular, complex waffle and pressed-in-grip substrates are costly, as they require generally thicker portions of raw substrate material that are then recessed or ablated in particular locations. Non-flat substrates may also require costly and delicate steps of substrate reversing and/or double sintering. Substrate reversal can cause undesirable delamination of selectively applied seeds. The subject technology also provides more uniform distribution of seeds and/or anode bodies when such elements are formed using the subject stencil printing techniques.

Specific comparisons have been made between capacitors made using the subject dry powder printing techniques to form capacitor seeds as opposed to a conventional method for forming seeds. In such comparison, the capacitors formed in accordance with the new stencil printing techniques achieved an advantageously increased capacitance and advantageously reduced Equivalent Series Resistance (ESR), while maintaining comparable levels of leakage current and dissipation factor.

The present invention may be better understood by reference to the following examples.

Test Procedures

Capacitance, Dissipation Factor, ESR and Leakage Current (DCL)

Capacitance, dissipation factor and equivalent series resistance (ESR) were measured using an HP 4263 Precision LCZ meter with a 1 volt signal having a 1.5 volt DC bias. For capacitance and dissipation factor, the meter was set at an operating frequency of about 120 Hz. For ESR, the meter was set at an operating frequency of about 100 kHz. The leakage current was measured using an HP 6643 power supply and a test procedure with operating conditions set to a temperature of 25° C. and at a predetermined rated voltage after a given soak time of about 10 seconds.

EXAMPLE 1

Seeds

Solid electrolytic capacitors such as generally corresponding to the component shown in FIG. 7 were constructed using a tantalum wafer substrate with a thickness of about 10 mils (250 microns). A stencil having a thickness of about 50 microns and respective apertures of about 1.1 mm² with a pitch of about 1.76 mm between apertures was used to selectively print dry powder seeds using a QR7 dry tantalum powder (rated at about 3,000 µF*V/g). The seeds were sintered, and then pressed anode bodies made of S-506 tantalum powder (rated at about 50,000 µF*V/g) were applied to the seeds, debind and sintered, then anodized to form a dielectric layer. A manganese dioxide solid electrolyte was formed, at which point the bodies were coated with a carbon coating and a silver coating. A device lid, encapsulation and termination components were added in accordance with conventional assembly technology and measured. Final product dimensions correspond to an 0805 "R" case size. Electrical properties are listed in the following table.

EXAMPLE 2

Seeds

Solid electrolytic capacitors such as generally corresponding to the component shown in FIG. 7 were constructed using a tantalum wafer substrate with a thickness of about 10 mils (250 microns). A stencil having a thickness of about 50 microns and respective apertures of about 0.6 mm² with a pitch of about 1.26 mm between apertures was used to selectively print dry powder seeds using a QR7 dry tantalum powder (rated at about 3,000 µF*V/g). Seeds were sintered, then pressed anode bodies made from STA 100 dry tantalum powder (rated at about 100,000 µF*V/g) were applied to the seeds, debind and sintered, then anodized to form a dielectric layer. A manganese dioxide solid electrolyte was formed, at which point the bodies were coated with a carbon coating and a silver coating. A device lid, encapsulation and termination components were added in accordance with conventional assembly technology and measured. Final product dimensions correspond to an 0603 "L" case size. Electrical properties are listed in the following table.

EXAMPLE 3

Seeds+Grips

Figure 15:
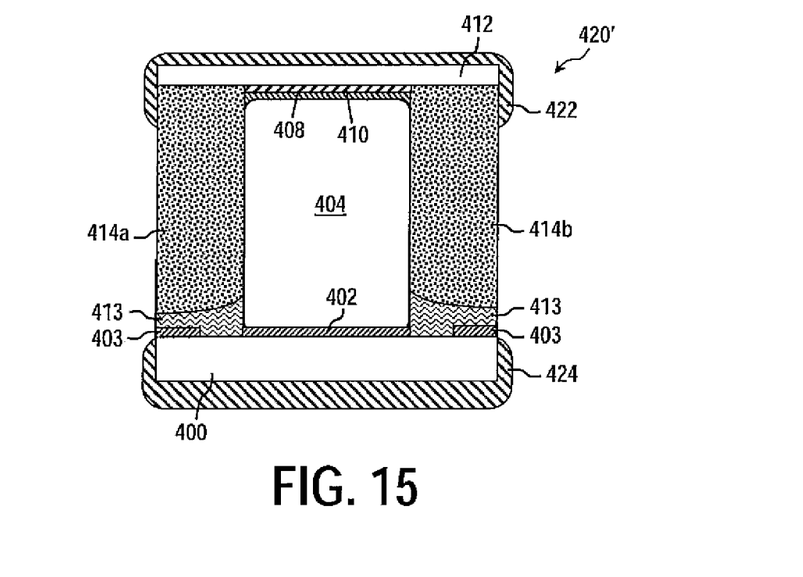
FIG. 15 is a cross-sectional view of a third exemplary solid electrolytic capacitor embodiment of the present invention.

Solid electrolytic capacitors such as generally corresponding to the component shown in FIG. 15 were constructed using a tantalum wafer substrate with a thickness of about 10 mils (250 microns). A stencil having a thickness of about 50 microns and respective apertures of about 0.6 mm² with a pitch of about 1.26 mm between apertures was used to selectively print dry powder seeds and grips using a QR7 dry tantalum powder (rated at about 3,000 µF*V/g). The seeds and grips were sintered, and then pressed anode bodies formed from S-700 tantalum powder (rated at about 70,000 µF*V/g) were applied to the seeds. The anodes are then debind and sintered, then anodized to form a dielectric layer. A manganese dioxide solid electrolyte was formed, at which point the bodies were coated with a carbon coating and a silver coating. A device lid, encapsulation and termination components were added in accordance with conventional assembly technology and measured. Final product dimensions correspond to an 0603 "L" case size. Electrical properties are listed in the following table.

EXAMPLES 4, 5 AND 6

Seeds

Solid electrolytic capacitors such as generally corresponding to the component shown in FIG. 7 were constructed using a tantalum wafer substrate with a thickness of about 6 mils (150 microns). A stencil having a thickness of about 50 microns and respective apertures of about 0.38 mm$^2$ with a radius of about 0.08 mm was used to selectively print dry powder seeds using a QR7 dry tantalum powder (rated at about 3,000 μF*V/g). Seeds were sintered, then pressed anode bodies formed from STA150 dry tantalum powder (rated at about 150,000 μF*V/g) were applied to the seeds, debind and sintered, then anodized to form a dielectric layer. Three different forming voltages were used during anodization. In example 4, the parts were anodized with a forming voltage of 7.5V and wet capacitance of about 10.3 μF. In example 5, the parts were anodized with a forming voltage of 17 V and wet capacitance of about 4.3 μF. In example 6, the parts were anodized with a forming voltage of 25 V and wet capacitance of about 2.43 μF. A manganese dioxide solid electrolyte was formed, at which point the bodies were coated with a carbon coating and a silver coating. A device lid, encapsulation and termination components were added in accordance with conventional assembly technology and measured. Final product dimensions correspond to an 0402 "K" case size. Electrical properties are listed in the following table.

EXAMPLE 7

Seeds

Solid electrolytic capacitors such as generally corresponding to the component shown in FIG. 7 were constructed using a tantalum wafer substrate with a thickness of about 6 mils (150 microns). A stencil having a thickness of about 50 microns and respective apertures of about 2.4 mm by 0.7 mm with a radius of about 0.15 mm was used to selectively print dry powder seeds using a QR7 dry tantalum powder (rated at about 3,000 μF*V/g). Seeds were sintered, then pressed anode bodies made of S-506 tantalum powder (rated at about 50,000 μF*V/g) were applied to the seeds, debind and sintered, then anodized to form a dielectric layer. A manganese dioxide solid electrolyte was formed, at which point the bodies were coated with a carbon coating and a silver coating. A device lid, encapsulation and termination components were added in accordance with conventional assembly technology and measured. Final product dimensions correspond to a 1210 "T" case size. Electrical properties are listed in the following table.

EXAMPLE 8

Anodes

Anodes were stencil printed directly on a tantalum wafer substrate having a thickness of about 10 mils (250 microns) without the inclusion of seed layers. A stencil having a thickness of about 100 microns was used to form anode bodies (corresponding to respective aperture size) of about 0.6 mm$^2$ and 100 microns tall with a pitch of about 1.26 mm. A dry tantalum powder rated at about 200,000 μF*V/g was used to form the anode bodies. The printed powder anodes were then sintered at about 1300° C., although higher temperatures would be better to increase bonding strength.

EXAMPLE 9

Anodes

Anodes were stencil printed on a tantalum wafer substrate having a thickness of about 10 mils (250 microns) both directly (without the inclusion of seed layers) and with seeds. A stencil having a thickness of about 400 microns was used to form anode bodies (corresponding to respective aperture size) of about 7.31 mm by 4.36 mm and 400 microns tall. S506 dry tantalum powder rated at about 50,000 μF*V/g was used to form the anode bodies. The printed powder anodes were then sintered under vacuum at about 1370° C.

The electrical properties of the samples made in Examples 1-7 were then tested. The average results are shown below in Table 1.

TABLE 1

| Capacitor | Cap (μF) | DF (%) | ESR (Ω) | Leakage Current (μA) |
|---|---|---|---|---|
| Example 1 - End of Process | 10.23 | 2.02 | 0.846 | 0.158 |
| Example 1 - Mounted | 10.27 | 2.34 | 0.814 | 0.076 |
| Example 2 - End of Process | 19.97 | 11.84 | 1.965 | 0.491 |
| Example 2 - Mounted | 19.92 | 12.92 | 2.661 | 0.552 |
| Example 3 - End of Process | 9.45 | 9.20 | 3.208 | 0.043 |
| Example 3 - Mounted | 8.98 | 5.14 | 1.418 | 0.055 |
| Example 4 - End of Process | 8.65 | 11.10 | 5.63 | 0.334 |
| Example 4 - Mounted | 8.85 | 7.33 | 2.64 | 0.048 |
| Example 5 - End of Process | 3.88 | 8.13 | 12.48 | 0.008 |
| Example 5 - Mounted | 3.41 | 8.59 | 6.27 | 0.017 |
| Example 6 - End of Process | 2.02 | 6.03 | 7.86 | 0.017 |
| Example 6 - Mounted | 2.14 | 3.32 | 5.23 | 0.010 |
| Example 7 - End of Process | 45.43 | 7.33 | 0.315 | 0.982 |
| Example 7 - Mounted | 44.24 | 6.89 | 0.414 | 0.423 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method of forming anodic components for electrolytic capacitors, comprising:
    positioning a stencil adjacent to a substrate, the stencil being formed to define a plurality of apertures therethrough;
    selectively printing a plurality of printed powder portions on the substrate by placing dry valve metal powder into selected ones of the plurality of apertures defined in the stencil; and
    sintering the printed powder portions to form respective anodic components for multiple respective electrolytic capacitors, wherein the printed powder portions serve as respective capacitor seeds, and wherein the method further comprises placing an anode body on top of each printed powder portion.

2. The method of claim 1, wherein the substrate comprises an electrically conductive wafer and wherein the dry powder used to selectively print the plurality of printed powder portions comprises one or more of tantalum, niobium, or an electrically conductive oxide thereof.

3. The method of claim 1, wherein the amount of printed powder in each respective anodic component is distributed in a substantially uniform fashion across a portion of the substrate.

4. The method of claim 1, wherein the dry powder is characterized by a particle size that is less than or equal to the thickness of the stencil.

5. The method of claim 1, wherein placing an anode body on top of each printed powder portion comprises:
provide a stencil formed to define a plurality of apertures therethrough; and
selectively printing one or more layers of printed powder to form respective anode bodies on top of the respective seeds by placing dry powder into selected ones of the plurality of apertures defined in the stencil.

6. The method of claim 5, wherein the dry powder used to selectively print one or more layers of printed powder to form respective anode bodies comprises one or more of tantalum, niobium, or an electrically conductive oxide thereof.

7. The method of claim 1, wherein said step of placing an anode body on top of each printed powder portion comprises aligning a pressed anode pellet on top of each printed powder portion and sintering the pressed anode pellet to the printed powder portion.

8. The method of claim 1, further comprising steps of:
forming a dielectric layer over the anode bodies;
forming a cathode layer over the dielectric layer to yield resultant capacitor bodies;
encapsulating the side walls of the capacitor bodies with an electrically insulating material; and
dividing the processed substrate into a plurality of individual capacitor bodies each having a sheath of encapsulating material, an anode terminal surface portion at one end and a cathode terminal surface portion at the other end.

9. The method of claim 1, wherein sintering the printed powder portions comprises sintering at a temperature of between about 1700° C. and about 1900° C., and wherein the method further comprises sintering the anode bodies to the capacitor seeds at a temperature of between about 1300° C. and about 1700° C.

10. The method of claim 1, wherein the substrate comprises a tantalum wafer having a substantially uniform thickness selected from a range of between about 50 microns and about 400 microns.

11. The method of claim 1, wherein the printed powder portions further comprise a plurality of grips outlying the respective capacitor seeds; and wherein the method further comprises applying an insulating material over the plurality of grips.

12. The method of claim 1, wherein the printed powder portions comprise reference lines printed to one or more edges of the substrate for identifying where to cut the substrate to form discrete capacitor elements.

13. A capacitor formed by the method of claim 1.

14. A method of forming anodic components for electrolytic capacitors, comprising:
positioning a stencil adjacent to a substrate, the stencil being formed to define a plurality of apertures therethrough;
selectively printing a plurality of printed powder portions on the substrate by placing dry valve metal powder into selected ones of the plurality of apertures defined in the stencil; and
sintering the printed powder portions to form respective anodic components for multiple respective electrolytic capacitors, wherein the printed powder portions serve as respective anode bodies, and wherein the method further comprises coupling an anode lead to each of the respective printed powder anode bodies.

15. The method of claim 14, wherein the substrate comprises an electrically conductive wafer and wherein the dry powder used to selectively print the plurality of printed powder portions comprises one or more of tantalum, niobium, or an electrically conductive oxide thereof.

16. The method of claim 14, wherein the amount of printed powder in each respective anodic component is distributed in a substantially uniform fashion across a portion of the substrate.

17. The method of claim 14, wherein the dry powder is characterized by a particle size that is less than or equal to the thickness of the stencil.

18. The method of claim 17, further comprising:
forming a dielectric layer over the anode bodies;
forming a cathode layer over the dielectric layer to yield resultant capacitor bodies;
electrically connecting the anode lead to an anode termination; and
electrically connecting the cathode layer to a cathode termination.

19. The method of claim 14, wherein the substrate comprises one of a wafer, foil or tape.

20. A capacitor formed by the method of claim 14.

* * * * *